(12) United States Patent
Hamada

(10) Patent No.: US 9,974,104 B2
(45) Date of Patent: May 15, 2018

(54) WIRELESS COMMUNICATION APPARATUS AND METHOD FOR SEAMLESSLY COMMUNICATING DATA BY SETTING UP AND SWITCHING BETWEEN MULTIPLE NETWORKS

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/268,824

(22) Filed: Sep. 19, 2016

(65) Prior Publication Data

US 2017/0006655 A1 Jan. 5, 2017

Related U.S. Application Data

(63) Continuation of application No. 14/604,031, filed on Jan. 23, 2015, now Pat. No. 9,491,791.

(30) Foreign Application Priority Data

Feb. 6, 2014 (JP) ................................ 2014-021704

(51) Int. Cl.
*H04W 36/00* (2009.01)
*H04W 4/00* (2018.01)
(Continued)

(52) U.S. Cl.
CPC ......... *H04W 76/023* (2013.01); *H04W 4/008* (2013.01); *H04W 36/0022* (2013.01);
(Continued)

(58) Field of Classification Search
CPC ............. H04W 36/0022; H04W 4/008; H04W 72/1215; H04W 76/023; H04W 84/12; H04W 88/06
See application file for complete search history.

(56) References Cited

U.S. PATENT DOCUMENTS 8,238,266 B2 8/2012 Hamada
8,335,489 B2 12/2012 Hamada
(Continued)

FOREIGN PATENT DOCUMENTS

CN 101911598 A 12/2010
CN 103312383 A 9/2013
(Continued)

OTHER PUBLICATIONS

"Connection Handover 1.2", Technical Specification (NFC Forum issued 2010.7.7), pp. 1-27.
(Continued)

*Primary Examiner* — Devan Sandiford
(74) *Attorney, Agent, or Firm* — Carter, DeLuca, Farrell & Schmidt, LLP

(57) ABSTRACT

A communication apparatus is capable of communicating with another communication apparatus by a first communication scheme and by a second communication scheme for which a communication speed is faster or a communication range is longer than that of the first communication scheme. The communication apparatus, in a case where it is determined that the communication by the second communication scheme was already being performed, includes, in a response corresponding to a request received from an other communication apparatus, information indicating that control for the communication by the second communication scheme based on the request is unnecessary, and transmits the response to the other communication apparatus.

11 Claims, 15 Drawing Sheets

(51) Int. Cl.
*H04W 72/12* (2009.01)
*H04W 76/02* (2009.01)
*H04W 84/12* (2009.01)
*H04W 88/06* (2009.01)

(52) U.S. Cl.
CPC ........ *H04W 72/1215* (2013.01); *H04W 84/12* (2013.01); *H04W 88/06* (2013.01)

(56) References Cited

U.S. PATENT DOCUMENTS

| | | | |
|---|---|---|---|
| 8,761,049 B2 | 6/2014 | Hamada | |
| 9,060,082 B2* | 6/2015 | Watanabe | H04N 1/00233 |
| 9,088,968 B2* | 7/2015 | Ando | H04W 76/021 |
| 9,294,870 B2* | 3/2016 | Matsuda | H04W 4/008 |
| 2011/0275316 A1* | 11/2011 | Suumaki | G06K 7/10237 |
| | | | 455/41.1 |
| 2012/0147825 A1* | 6/2012 | Hassan | H04L 12/2818 |
| | | | 370/329 |
| 2012/0178421 A1 | 7/2012 | Fujii | |
| 2012/0290731 A1* | 11/2012 | Suumaki | H04L 61/2007 |
| | | | 709/228 |
| 2013/0260682 A1* | 10/2013 | Suzuki | H04W 88/06 |
| | | | 455/41.1 |
| 2013/0260683 A1* | 10/2013 | Suzuki | H04W 4/008 |
| | | | 455/41.1 |
| 2013/0324042 A1 | 12/2013 | Shinomiya | |
| 2014/0094117 A1* | 4/2014 | Rajendran | H04W 12/04 |
| | | | 455/41.1 |
| 2014/0227972 A1* | 8/2014 | Swaminathan | H04B 5/0031 |
| | | | 455/41.1 |
| 2015/0111493 A1* | 4/2015 | Berkema | H04W 8/005 |
| | | | 455/41.1 |
| 2015/0116746 A1* | 4/2015 | Park | G06F 3/1263 |
| | | | 358/1.13 |
| 2015/0257188 A1* | 9/2015 | Patil | H04W 4/008 |
| | | | 455/41.1 |
| 2015/0304805 A1* | 10/2015 | Suzuki | H04W 4/008 |
| | | | 455/41.1 |
| 2016/0278006 A1* | 9/2016 | Lee | H04W 12/00 |

FOREIGN PATENT DOCUMENTS

| | | |
|---|---|---|
| CN | 103906194 A | 7/2014 |
| EP | 2645812 A2 | 10/2013 |
| JP | 2008-131175 A | 6/2008 |
| JP | 2012-231403 A | 11/2012 |
| JP | 2012-244287 A | 12/2012 |
| JP | 2013-214804 A | 10/2013 |
| JP | 2014-027384 A | 2/2014 |
| JP | 2015-073249 A | 4/2015 |
| RU | 2487493 C2 | 7/2013 |

OTHER PUBLICATIONS

European Search Report issued in corresponding application No. 15154175.2 dated Jun. 17, 2015.
Office Action for corresponding Russian Application No. 2015103919 dated Jul. 13, 2016.
Office Action for corresponding Chinese Patent Application No. 201510061366.4 dated Sep. 14, 2016.
Japanese Office Action dated Dec. 4, 2017 in corresponding Japanese Patent Application No. 2014-021704, 7 pages.

* cited by examiner

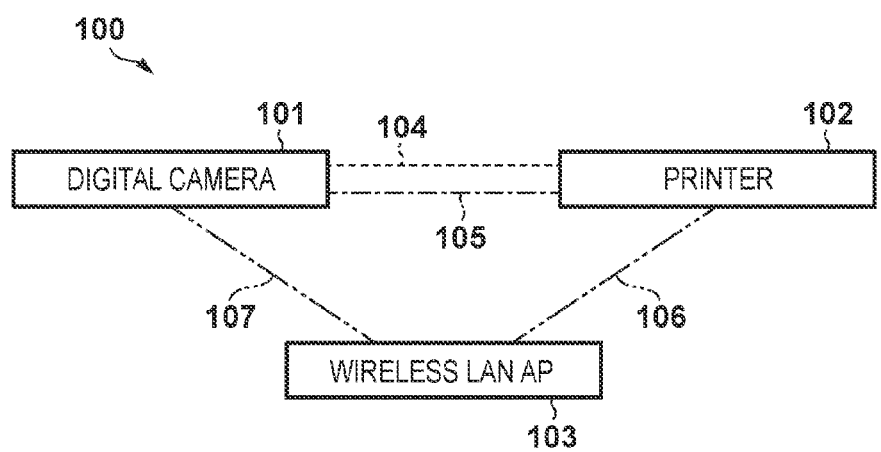
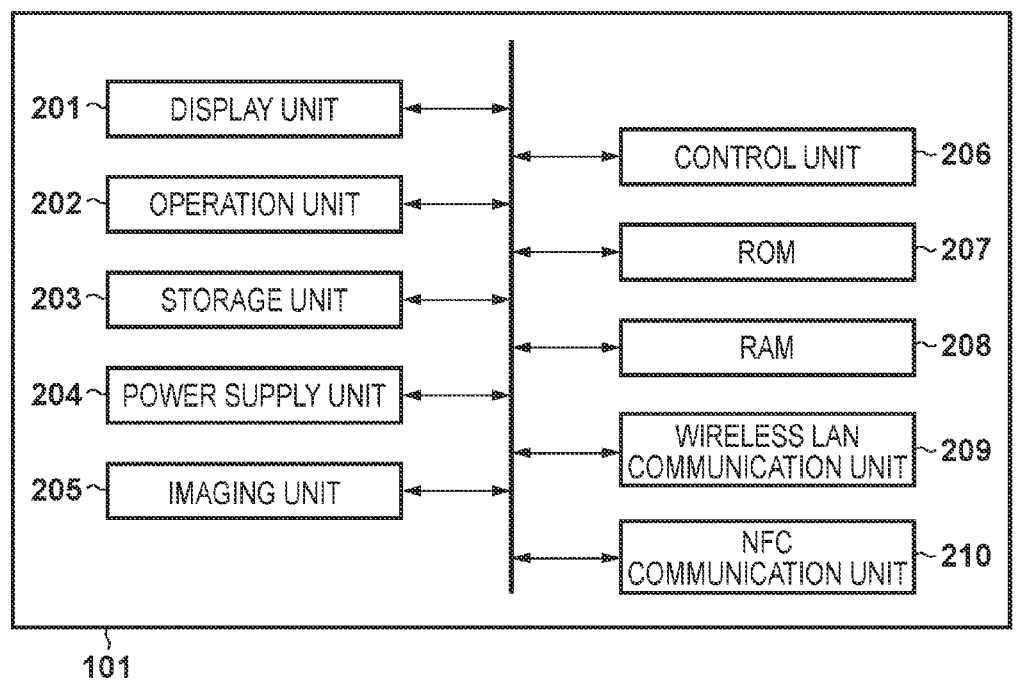

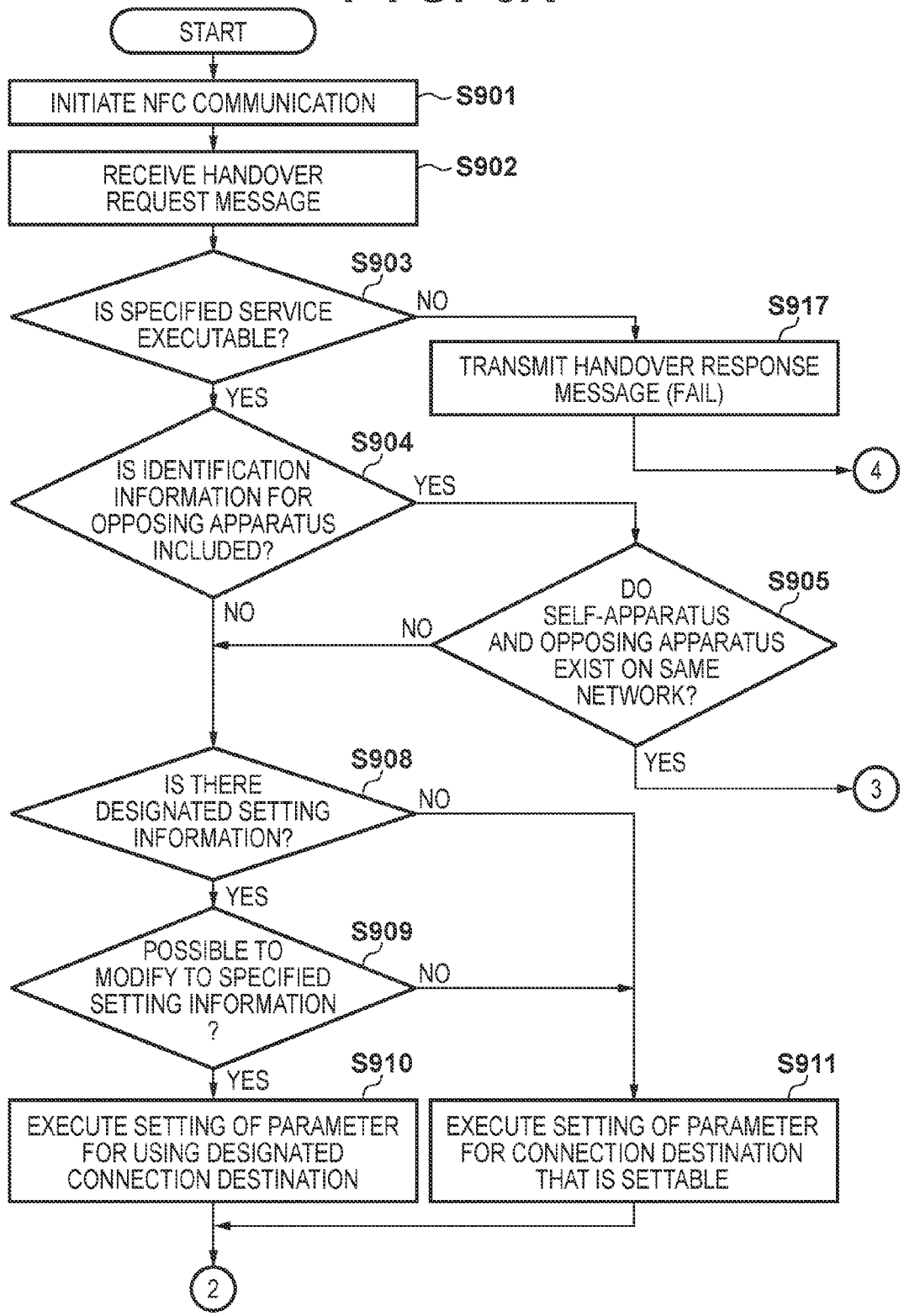

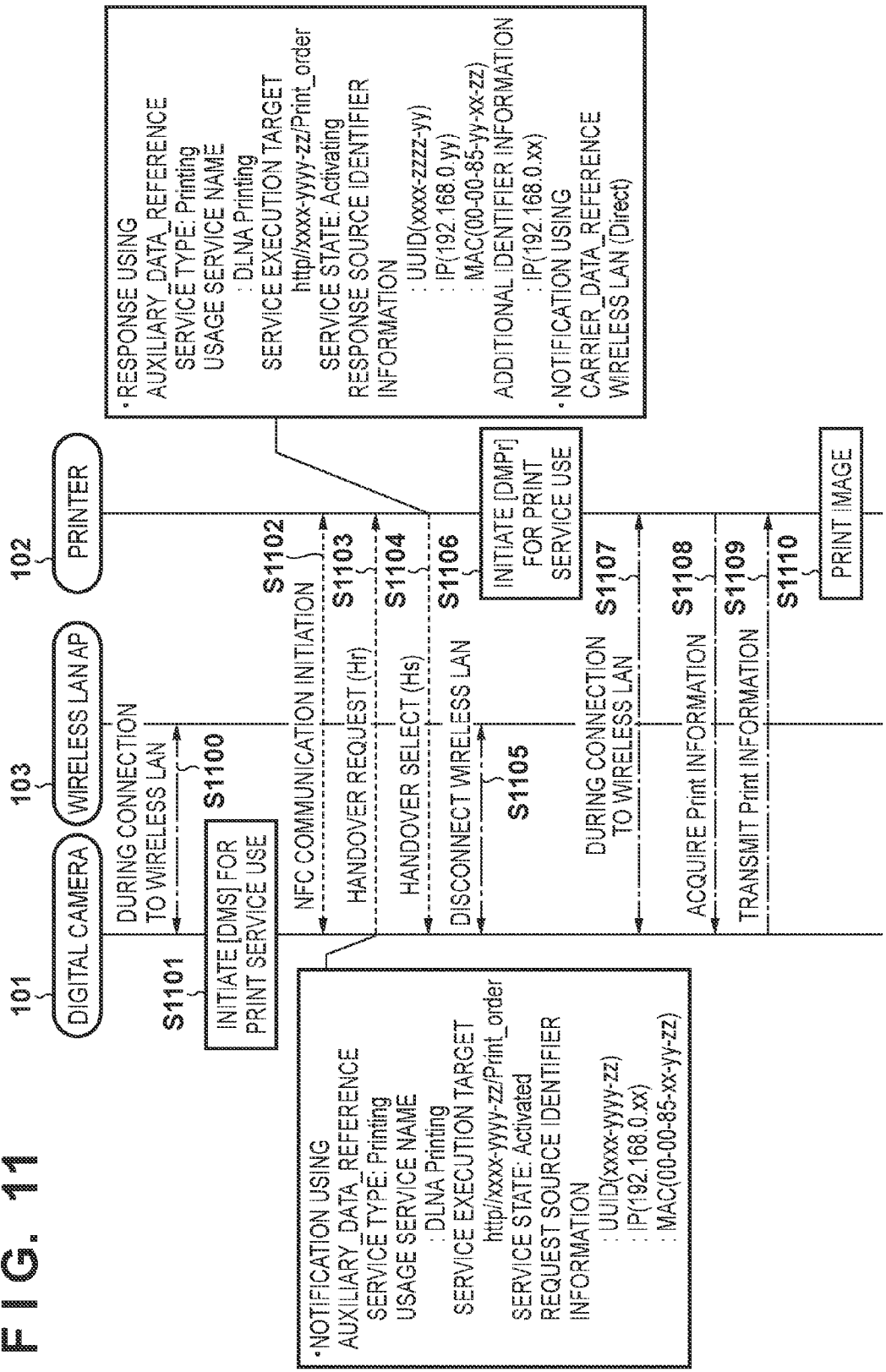

FIG. 12A

ADDRESS REGISTRATION TABLE FOR EACH COMMUNICATION APPARATUS
THAT IS CONNECTED TO THE SAME WIRELESS LAN AP

| UUID | MAC | IP | Nick name | Conform Time |
|---|---|---|---|---|
| xxxx-yyyy-zz | 00-00-85-xx-yy-zz | 192.168.0.xx | Digital Camera1 | 40 |
| xxxx-zzzz-yy | 00-00-85-yy-xx-zz | 192.168.0.yy | IJ Printer 1 | 50 |
| : | : | : | : | : |
| : | : | : | : | : |
| zzzz-xxxx-yy | zz-yy-xx-00-11 | 192.168.0.1 | Wi-Fi AP 1 | 10 |

FIG. 12B

ADDRESS REGISTRATION TABLE FOR THE COMMUNICATION APPARATUS 102
WHEN UNCONNECTED TO WIRELESS LAN

| UUID | MAC | IP | Nick name | Conform Time |
|---|---|---|---|---|
| xxxx-zzzz-yy | 00-00-85-xx-yy-zz | NULL | IJ Printer 1 | NULL |
|  |  |  |  |  |
|  |  |  |  |  |

FIG. 12C

ADDRESS REGISTRATION TABLE FOR THE COMMUNICATION APPARATUS 102
WHEN DIRECTLY CONNECTED TO WIRELESS LAN

| UUID | MAC | IP | Nick name | Conform Time |
|---|---|---|---|---|
| xxxx-yyyy-zz | 00-00-85-xx-yy-zz | 192.168.0.xx | Digital Camera1 | 0 |
| xxxx-zzzz-yy | 00-00-85-yy-xx-zz | 192.168.0.yy | IJ Printer 1 | 0 |
|  |  |  |  |  |

FIG. 13A

| HANDOVER REQUEST RECORD | REFERENCE DESTINATION NDEF RECORD | · · · | REFERENCE DESTINATION NDEF RECORD |
|---|---|---|---|

FIG. 13B

| HANDOVER SELECT RECORD(MB=1, ME=1) | REFERENCE DESTINATION NDEF RECORD | · · · | REFERENCE DESTINATION NDEF RECORD |
|---|---|---|---|

MB: Message Begin  ME: Message End

FIG. 13C    PAYLOAD OF HANDOVER REQUEST RECORD

| MAJOR_VERSION | MINOR_VERSION |
|---|---|
| COLLISION_RESOLUTION_RECORD ||
| ALTERNATIVE_CARRIER_RECORD_1 ||
| ⋮ ||
| ALTERNATIVE_CARRIER_RECORD_N ||

FIG. 13D    PAYLOAD OF HANDOVER SELECT RECORD

| MAJOR_VERSION | MINOR_VERSION |
|---|---|
| ALTERNATIVE_CARRIER_RECORD_1 ||
| ⋮ ||
| ALTERNATIVE_CARRIER_RECORD_N ||
| ERROR_RECORD ||

F I G. 13E  PAYLOAD OF ALTERNATIVE_CARRIER_RECORD

| Reserved_Future_Use | CPS |
|---|---|
| CARRIER_DATA_REFERENCE ||
| AUXILIARY_DATA_REFERENCE_COUNT ||
| AUXILIARY_DATA_REFERENCE_1 ||
| ⋮ ||
| AUXILIARY_DATA_REFERENCE_N ||

CPS: 00h :Inactive(carrier is currently off)
　　 01h :Active(carrier is currently on)
　　 02h :Activating(activating the carrier)
　　 03h :Unknown(Via the router)
※CPS: Carrier Power Status

F I G. 13F  PAYLOAD OF CARRIER_DATA_REFERENCE
(POINTER OF REFERENCE DESTINATION NDEF)

| CARRIER_DATA_REFERENCE_LENGTH |
|---|
| CARRIER_DATA_REFERENCE_CHAR_1 |
| ⋮ |
| CARRIER_DATA_REFERENCE_CHAR_N |

F I G. 13G  PAYLOAD OF AUXILIARY_DATA_REFERENCE
(POINTER OF REFERENCE DESTINATION NDEF)

| AUXILIARY_DATA_REFERENCE_LENGTH |
|---|
| AUXILIARY_DATA_REFERENCE_CHAR_1 |
| ⋮ |
| AUXILIARY_DATA_REFERENCE_CHAR_N |

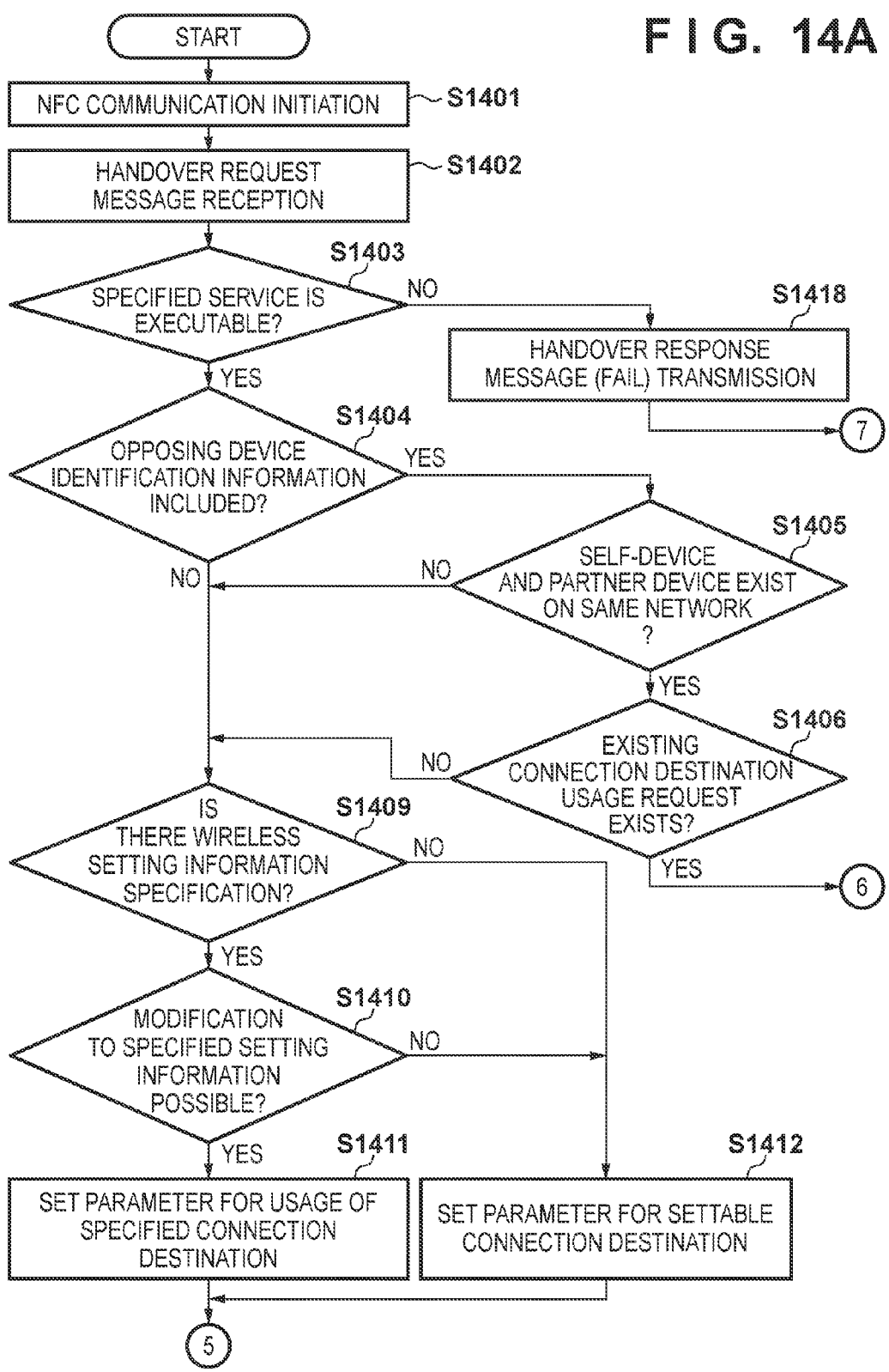

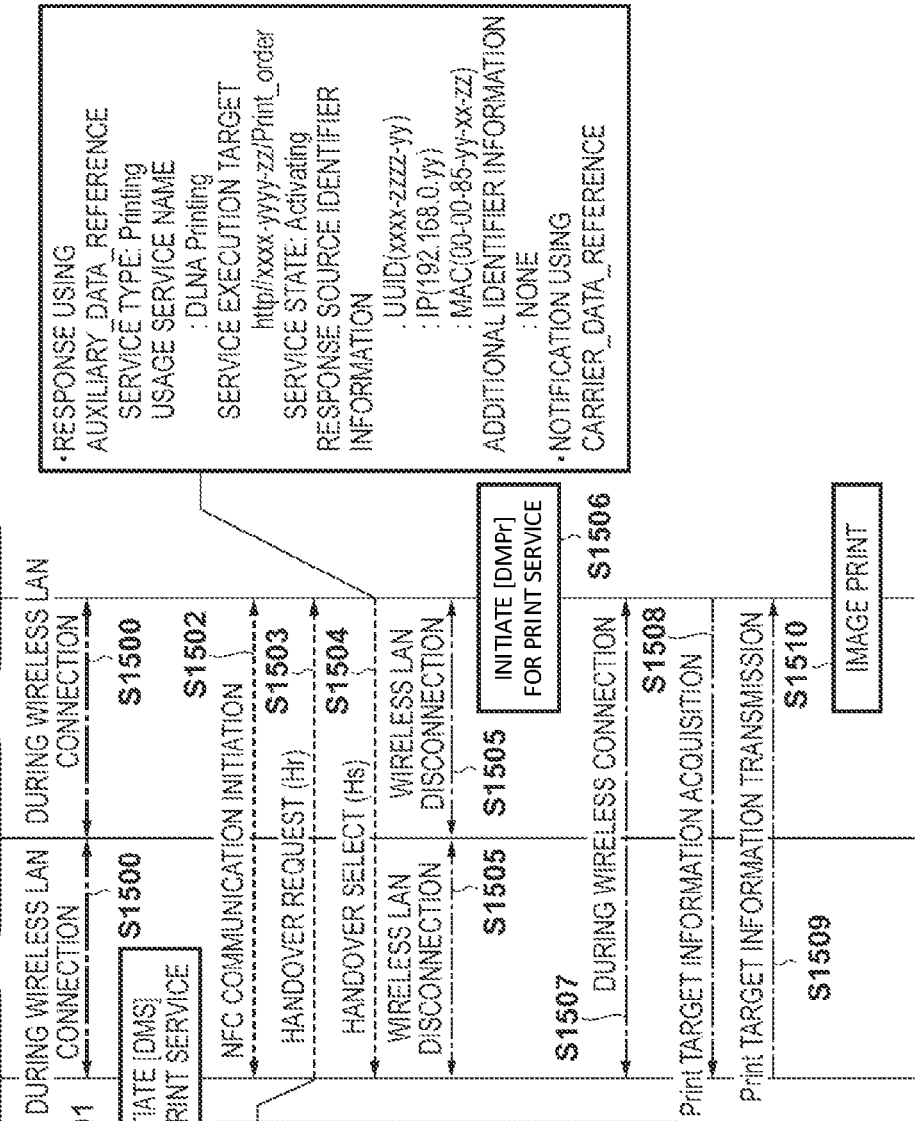

WIRELESS COMMUNICATION APPARATUS AND METHOD FOR SEAMLESSLY COMMUNICATING DATA BY SETTING UP AND SWITCHING BETWEEN MULTIPLE NETWORKS

CROSS REFERENCE TO RELATED APPLICATIONS

This application is a Continuation of U.S. patent application Ser. No. 14/604,031, filed on Jan. 23, 2015, which claims the benefit and priority from Japanese Patent Application No. 2014-021704, filed Feb. 6, 2014, the disclosures of each of which are hereby incorporated by reference herein in their entirety.

BACKGROUND OF THE INVENTION

Field of the Invention

The present invention relates to a communication apparatus, a method of controlling the same, and a non-transitory computer-readable storage medium.

Description of the Related Art

In recent years, in mobile telephones, or the like, near field wireless communication such as NFC (Near Field Communication), IrDA (Infrared Data Association), TransferJet (registered trademark), or the like, has started to be used. By using this kind of near field wireless communication, by a user simply performing an operation of causing apparatuses to approach one another, data transmission and receiving between the apparatus can be performed. Also, there is a technique of transferring setting information for a wireless LAN (IEEE 802.11 series), Bluetooth (registered trademark), or the like, in order to connect with a partner apparatus via this kind of near field wireless communication and execute a high speed communication ("Connection Handover 1.2" Technical Specification (NFC Forum issued 2010 Jul. 7)). Also, there is an approach of a communication apparatus using a communication medium to which a connection has already been made, and performing a determination of whether a communication by that communication medium is possible based on an individual identifier of another apparatus, and, in a case where the communication is possible, not executing a setting modification based on transferred setting information, and rather continuing communication using the existing communication medium (Japanese Patent Laid-Open No. 2008-131175).

In the above described approach of continuing communication using the existing communication medium, the communication apparatus to which the setting information is transferred performs continued usage of the existing communication medium without performing a setting update. In other words, this kind of communication apparatus does not perform a feedback to the other apparatus of the result which is that updating of the setting was not performed based on the transferred setting information. In this way, in a use case in which apparatuses are caused to approach each other and a cooperative communication service is initiated between the apparatuses, opposing apparatuses cannot confirm immediately whether the communication apparatus on the other side, continues with the existing settings, or whether it modifies the settings based on setting information that is transferred. For this reason, there is a problem in that a communication apparatus employs setting information that is different to that of an opposing apparatus, setting of a communication path cannot be performed, and as a result a time period until a service initiation becomes longer unnecessarily.

SUMMARY OF THE INVENTION

The present invention was conceived in view of the above described problem, and provides, in embodiments, a technique for preventing excess processing and for shortening a time required until a service initiation in a case where, using an existing communication medium, communication is possible with an opposing apparatus.

According to one aspect of the present invention, there is provided a communication apparatus which comprises: a communication unit configured to be able to communicate with another communication apparatus by a first communication scheme and by a second communication scheme for which a communication speed is faster or a communication range is longer than that of the first communication scheme; a determination unit configured to determine whether or not, upon initiation of a communication by the first communication scheme, a communication by the second communication scheme was already being performed; and a generation unit configured to generate, based on information included in a request received by the communication unit by the communication by the first communication scheme, a response corresponding to the request, wherein the communication unit transmits the response generated by the generation unit to the other communication apparatus, and the generation unit, in a case where it is determined by the determination unit that the communication by the second communication scheme was already being performed, includes, in the response, information indicating that control for the communication by the second communication scheme based on the request is unnecessary.

Further features of the present invention will become apparent from the following description of exemplary embodiments (with reference to the attached drawings.

BRIEF DESCRIPTION OF THE DRAWINGS

FIG. 1 is a view for exemplifying a system configuration according to embodiments.

FIG. 2 is a view for illustrating an example of a hardware configuration for a digital camera 101 according to embodiments.

FIG. 9A and FIG. 9B are views for explaining an operational flow for the printer 102 according to the first embodiment.

FIG. 11 is a view (part 2) for explaining a communication sequence for the first embodiment.

FIG. 12A-FIG. 12C are views for illustrating examples of address registration table formats according to the present embodiment.

FIG. 13A-FIG. 13G are views for illustrating examples of message and information record formats for handover processing.

FIG. 14A and FIG. 14B are views for explaining an operational flow for the printer 102 according to a second embodiment.

FIG. 15 is a view for explaining a communication sequence for the second embodiment.

DESCRIPTION OF THE EMBODIMENTS

Figure 3:
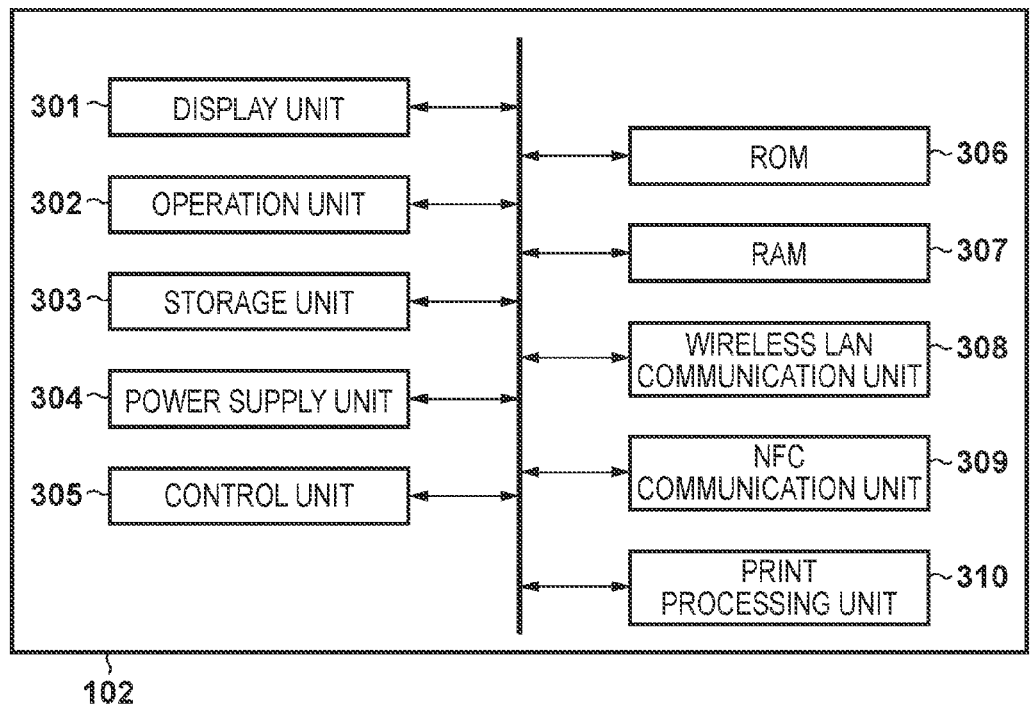
FIG. 3 is a view for illustrating an example of a hardware configuration for a printer 102 according to embodiments.

Below, a detailed explanation will be given with reference to the drawings for a communication apparatus according to the present invention. Firstly, explanation will be given for a system that is envisioned in embodiments to be explained later. FIG. 1 is a view for exemplifying a configuration of a system 100 according to embodiments. The system 100 according to embodiments is a communication apparatus that is comprised of a digital camera 101, a printer 102, and a wireless LAN access point 103 (hereinafter referred to as, a wireless LAN AP). The digital camera 101 and the printer 102 are capable of mutually communicating with each other by using an NFC communication path 104, a direct wireless LAN communication path 105, or indirect wireless LAN communication paths 105-107 via a wireless LAN AP 103.

FIG. 2 is a drawing showing a hardware configuration for the digital camera 101. The digital camera 101 is provided with a display unit 201, an operation unit 202, a storage unit 203, a power supply unit 204, an imaging unit 205, a control unit 206, a ROM 207, a RAM 208, a wireless LAN communication unit 209, and an NFC communication unit 210.

The display unit 201 is configured from, for example, an LCD and LED, comprises a function for outputting visibly recognizable information, and performs a display of a UI (User Interface) that corresponds to an application. The operation unit 202 comprises a function for a user to perform various input, or the like, and operate the communication apparatus. The storage unit 203 is configured by an HDD, and stores and manages, for example, various data such as wireless communication network information, data transmission and receiving information, and image data. The power supply unit 204 is, for example, a battery, which stores power for operating the apparatus on the whole, and provides power to each piece of hardware. The imaging unit 205 is configured from an image capturing element, a lens etc., and performs capture of photographs and movies. The control unit 206 is, for example, a CPU, which controls operation for each configuration element of the digital camera 101.

The ROM 207 stores control commands, or in other words, programs. Various operations explained later are realized by the control unit 206 executing programs stored in the ROM 207. The RAM 208 is used for temporary storage of data and work memory when executing programs. The wireless LAN communication unit 209 performs wireless LAN communication. The wireless LAN communication unit 209 performs wireless communication in compliance with the IEEE 802.11 series. Note, in the below embodiment, the wireless LAN communication unit 209 is described as performing wireless communication in compliance with the IEEE 802.11 series, but wireless communication may be performed using another communication scheme such as Bluetooth (registered trademark), or the like.

The NFC communication unit 210 performs NFC communication. The NFC communication unit 210 performs wireless communication in compliance with NFC (Near Field Communication). Also, once the NFC communication unit 210 detects a communicable apparatus that is within a communication range, it automatically establishes an NFC communication. Note, the NFC communication unit 210 is described as performing wireless communication in compliance with NFC; however, a wireless communication which uses another communication scheme wherein the communication range is shorter than a communication scheme used by the wireless LAN communication unit 209 may be performed. Also, it is assumed that the NFC communication unit 210 uses a communication scheme wherein the communication speed is slower than the communication scheme used by the wireless LAN communication unit 209.

FIG. 3 is a drawing showing a hardware configuration for the printer 102. In the configuration of the printer 102, when compared with the configuration of the digital camera 101 as shown in FIG. 2, a print processing unit 310 for an output function is provided instead of the imaging unit. A print processing unit 310 prints image data stored in a storage unit 303. An explanation of the other configuration elements will be omitted as these are equivalent to those of the configuration of the digital camera 101.

Figure 4:
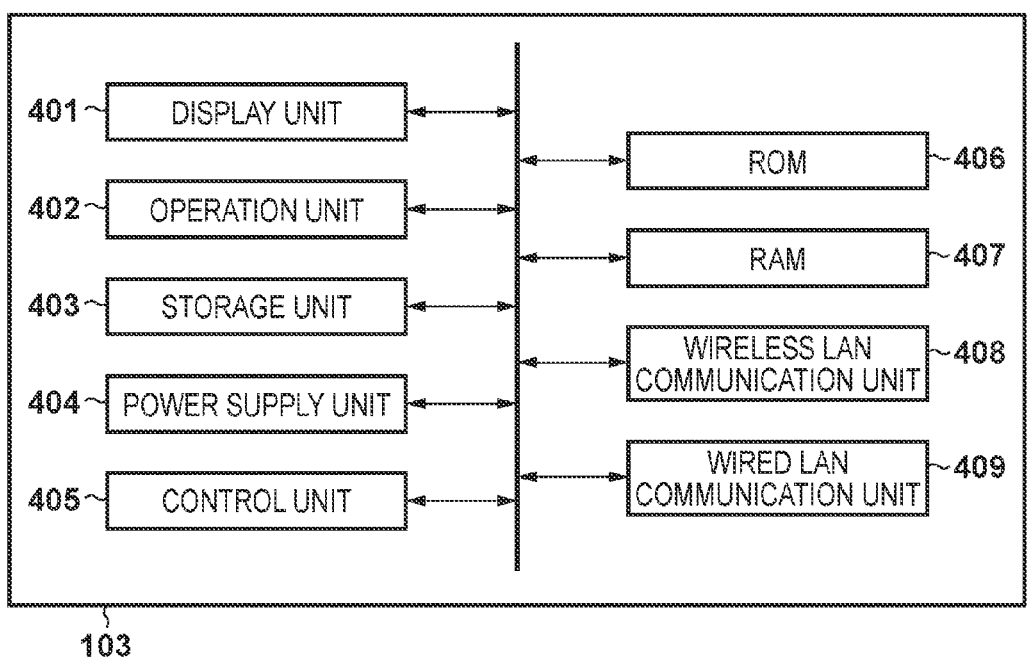
FIG. 4 is a view for illustrating an example of a hardware configuration for a wireless LAN access point 103 according to embodiments.

FIG. 4 is a drawing showing a hardware configuration for the wireless LAN AP 103. The configuration of the wireless LAN AP 103, when compared with the configuration of the digital camera 101 and the printer 102 shown in FIGS. 2 and 3, is provided with a wired LAN communication unit 409 in place of the NFC communication units as a communication function and also does not have an imaging unit or a print processing unit. An explanation of the other configuration elements will be omitted as they are equivalent to those of the configurations of the printer 102 and the digital camera 101.

Next, with reference to FIGS. 5 through 7, functional blocks for the digital camera 101, the printer 102, and the wireless LAN AP 103 will be explained. According to the present embodiment, the functional blocks for the digital camera 101, the printer 102, and the wireless LAN AP 103 are each stored in the ROM 207, the ROM 307 and a ROM 406 as programs. By the programs stored in the ROM 207, the ROM 307 and the ROM 406 being executed by the control unit 206, a control unit 305, and a control unit 405, corresponding functions are executed. Note, a part or all of the functions contained in the functional blocks may be implemented in hardware. In this case, a part or all of the functions contained in each of the functional blocks is configured from, for example, an ASIC (Application Specific Integrated Circuit).

Figure 5:
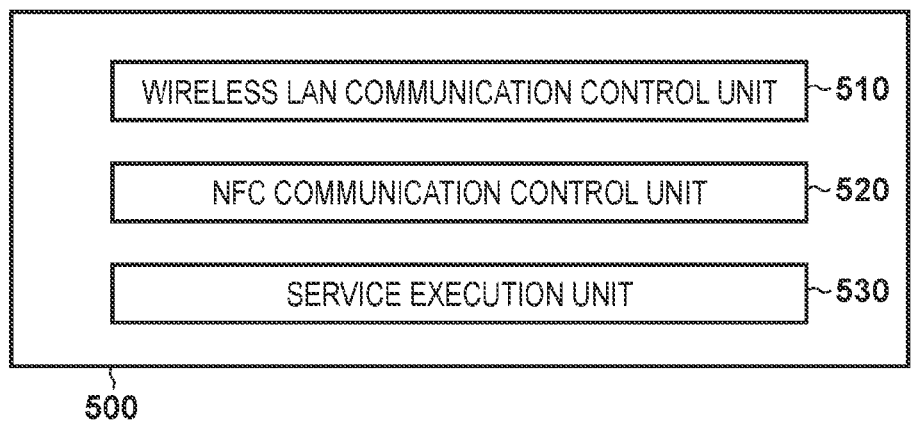
FIG. 5 is a view for illustrating an example of a functional block configuration for the digital camera 101 according to embodiments.

FIG. 5 is a drawing showing a functional block 500 for the digital camera 101. The digital camera 101 is comprised of a wireless LAN communication control unit 510, an NFC communication control unit 520, and a service execution unit 530. The wireless LAN communication control unit 510 controls wireless LAN communication via the wireless LAN communication unit 209. Also, the wireless LAN communication control unit 510 is comprised of an AP function that operates as an access point for a wireless LAN, and a Station function that operates as a wireless LAN terminal. The NFC communication control unit 520 controls NFC communication via the NFC communication unit 210. The service execution unit 530 manages external device service information executable by the digital camera 101 using the wireless LAN communication control unit 510, and executes services. Also, the service execution unit 530 manages service identifiers, service execution procedures that correspond to these, and option information for a service as service information. The digital camera 101 according to embodiments to be explained later, as an example, is able to execute a direct printing service. This direct printing service includes, for example, "DLNA Printing", "Pictbridge" and "DPOF Printing", or the like.

Figure 6:
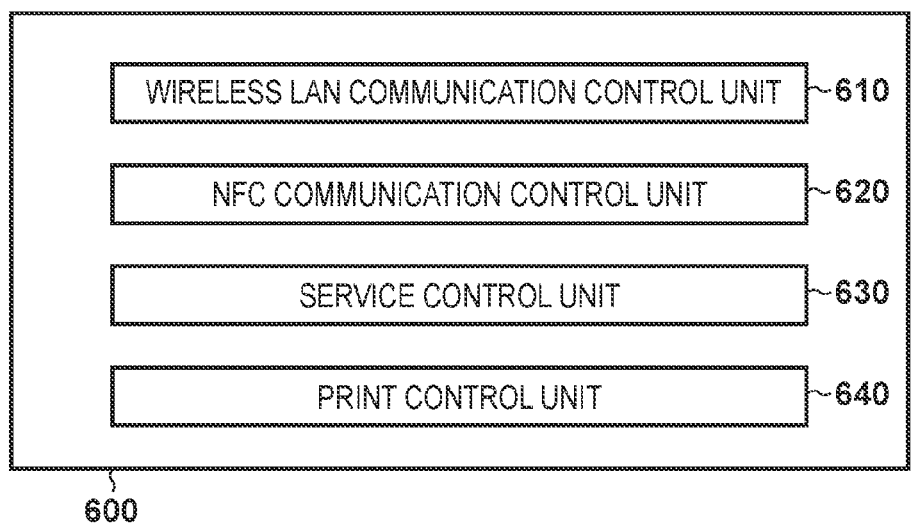
FIG. 6 is a view for illustrating an example of a functional block configuration for the printer 102 according to embodiments.

FIG. 6 is a drawing showing a functional block 600 for the printer 102. The printer 102 is comprised of a wireless LAN communication control unit 610, an NFC communication control unit 620, a service control unit 630, and a print control unit 640. The wireless LAN communication control unit 610 controls wireless LAN communication via the wireless LAN communication unit 308. Also, the wireless LAN communication control unit 610 is comprised of an AP function that operates as an access point for a wireless LAN, and a Station function that operates as a wireless LAN terminal. The NFC communication control unit 620 controls NFC communication via the NFC communication unit 309.

The printer 102 manages service information that is providable to an external device via the wireless LAN communication control unit 610, and the service control unit 630 executes the service. The service control unit 630 manages service (communication service) identifiers and service execution procedures that correspond to these, and option information for a service as service information. The printer 102 according to the embodiment to be explained later, as an example, is able to execute a direct printing service. This direct printing service includes, for example, "DLNA Printing", "Pictbridge" and "DPOF Printing" etc. The print control unit 640 controls print processing by the print processing unit 310. The service control unit 630 controls the print control unit 640 according to a request by an external device and can print print-data that is received from the external device.

Figure 7:
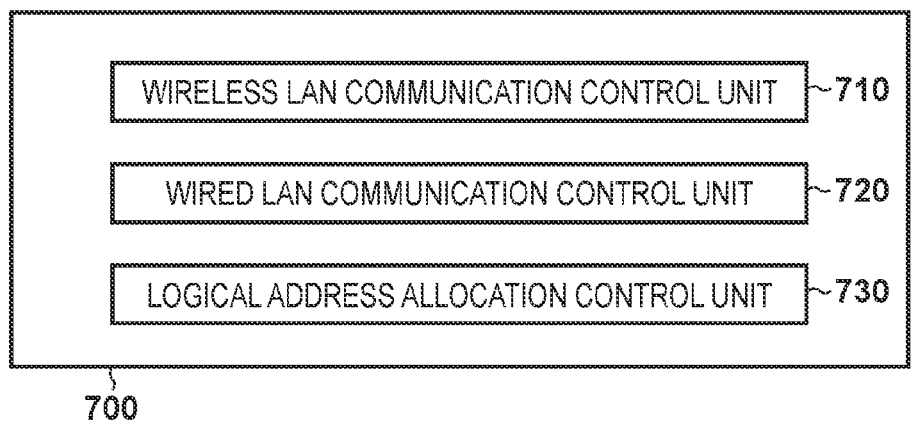
FIG. 7 is a view for illustrating an example of a functional block configuration for the wireless LAN access point according to embodiments.

FIG. 7 is a drawing showing a functional block 700 for the wireless LAN AP 103. The wireless LAN AP 103 is comprised of a wireless LAN communication control unit 710, a wired LAN communication control unit 720, and a logical address allocation control unit 730. The wireless LAN communication control unit 710 comprises an AP function that operates as an access point for a wireless LAN. The wired LAN communication control unit 720 performs communication control for a wired LAN. The logical address allocation control unit 730 performs control related to logical address (IP address, or the like) allocation for a partner apparatus that performs communication.

FIG. 13A-FIG. 13G are views for illustrating examples of messages for handover processing, and information record formats that configure the messages. Note, the messages and the information record formats are defined in an NFC Forum "Connection Handover 1.2" Technical Specification. A handover request message (FIG. 13A) includes a handover request record (FIG. 13C) in a first record. A handover select message (FIG. 13B) includes a handover select record (FIG. 13D) in a first record. An actual object of a reference destination NDEF record specified by a reference target record that is an "ALTERNATIVE_CARRIER_RECORD" (FIG. 13E) is mapped following the first record.

An actual object of information of a wireless LAN setting is stored in a reference destination NDEF record. For example, pointer information for a reference destination NDEF record is stored in a "CARRIER_DATA_REFERENCE" (FIG. 13F) that is contained in an "ALTERNATIVE_CARRIER_RECORD" (FIG. 13E). Also, the actual object of information regarding various setting information that is required, is additionally stored in a reference destination NDEF record. For example, pointer information for a reference destination NDEF record is stored in an "AUXILIARY_DATA_REFERENCE" (FIG. 13G) that is contained in an "ALTERNATIVE_CARRIER_RECORD" (FIG. 13E).

FIG. 12A-FIG. 12C are views for illustrating examples of memory formats for address registration tables, implemented within each communication apparatus according to the embodiment. FIG. 12A is an example of an address registration table memory for each apparatus in the case that the digital camera 101 and the printer 102 are connected to the same wireless LAN AP 103. FIG. 12B is an example of an address registration table memory for the printer 102 when unconnected to a wireless LAN. FIG. 12C is an example of an address registration table memory for the printer 102 when directly connected (direct connection) to a wireless LAN.

Below, an explanation of a specific embodiment will be given based on the above system configuration.

First Embodiment

The operational procedure between the digital camera 101 and the printer 102 according to the first embodiment will be explained using drawings. As an example, an explanation will be given for an operational procedure for executing a service for "DLNA Printing" via a P2P communication path, or an existing wireless LAN communication path between the digital camera 101 and the printer 102.

Figure 8A:
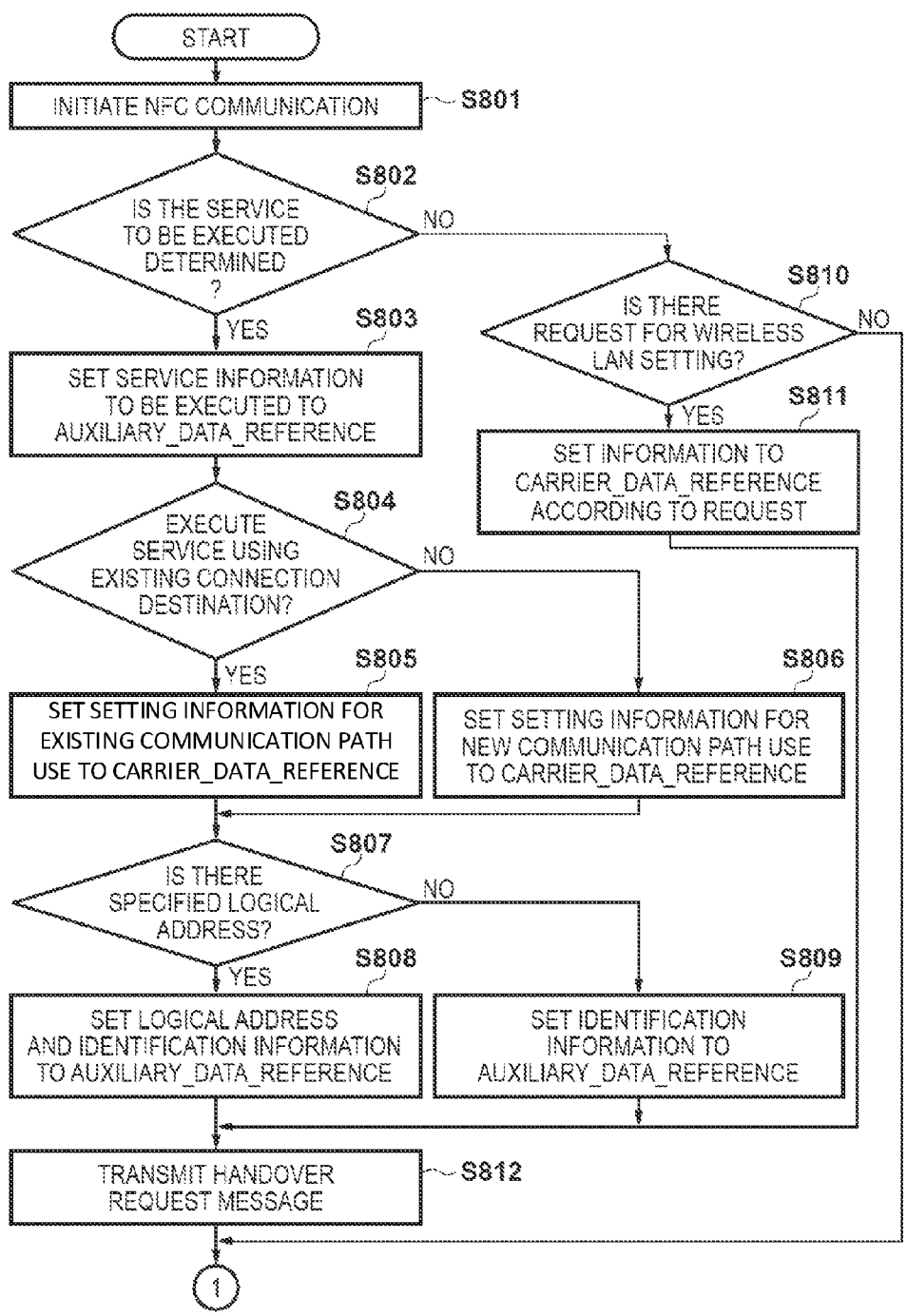
FIG. 8A and FIG. 8B are views for explaining an operational flow for the digital camera 101 according to a first embodiment.
Figure 8B:
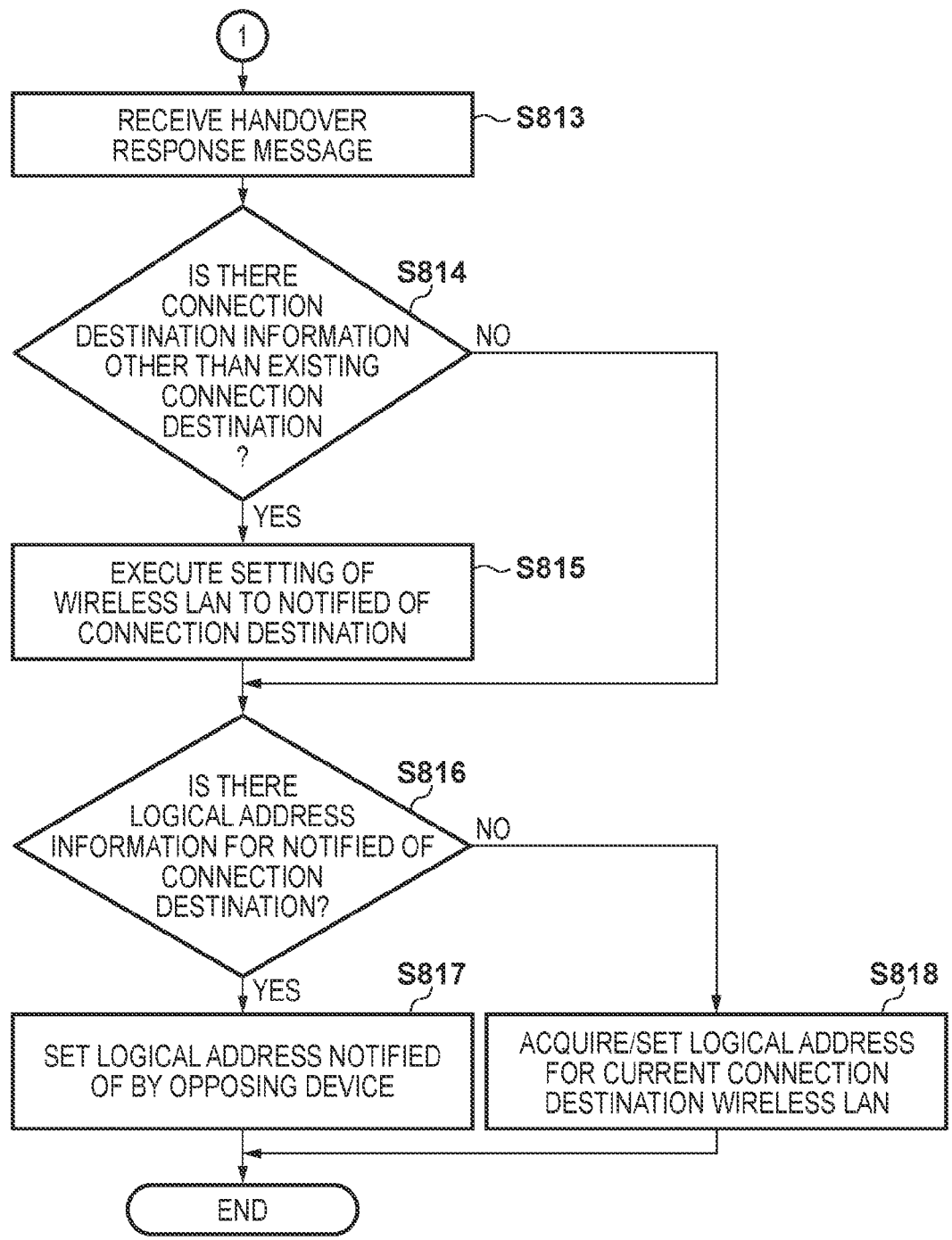
Figure 9B:
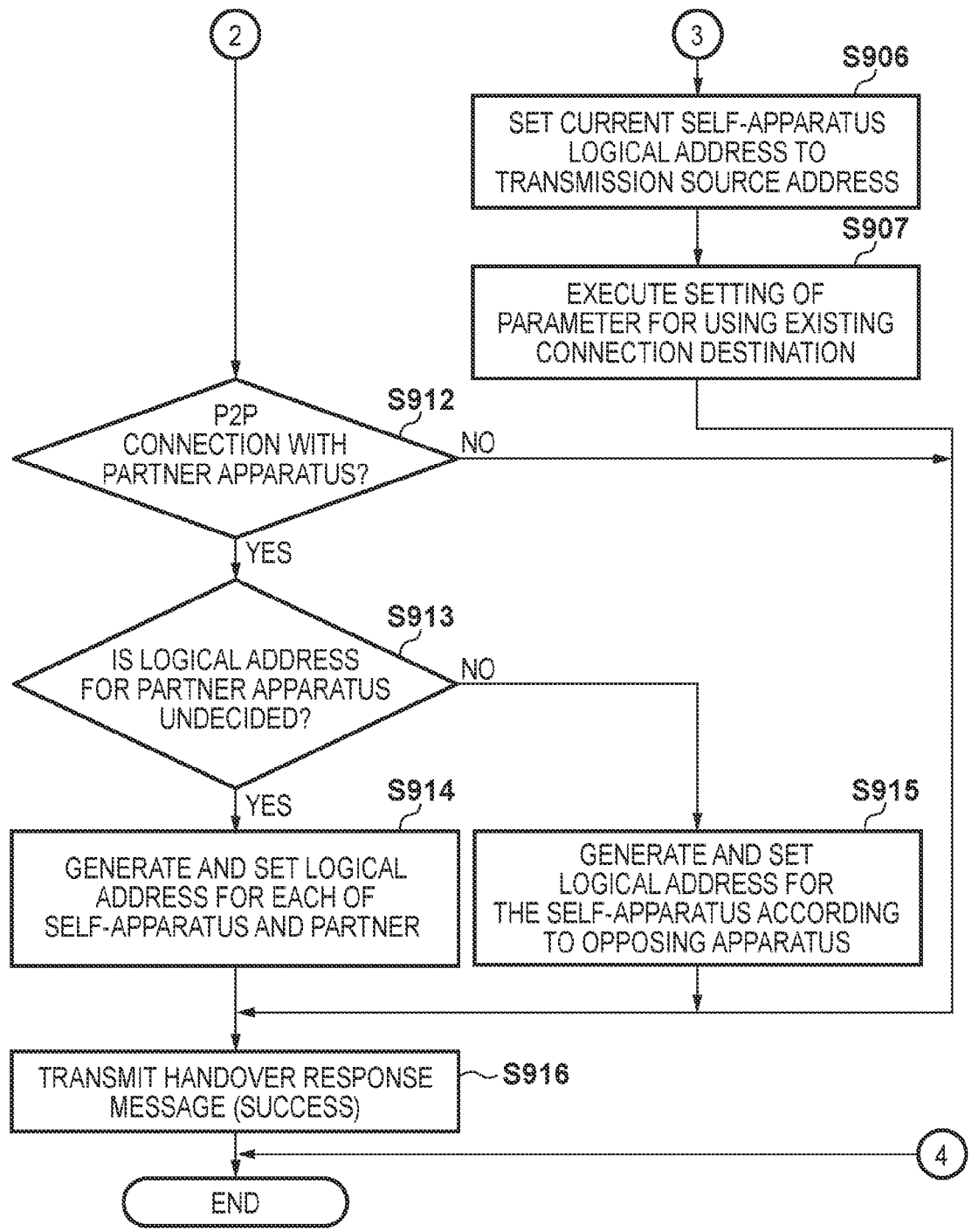
Figure 10:
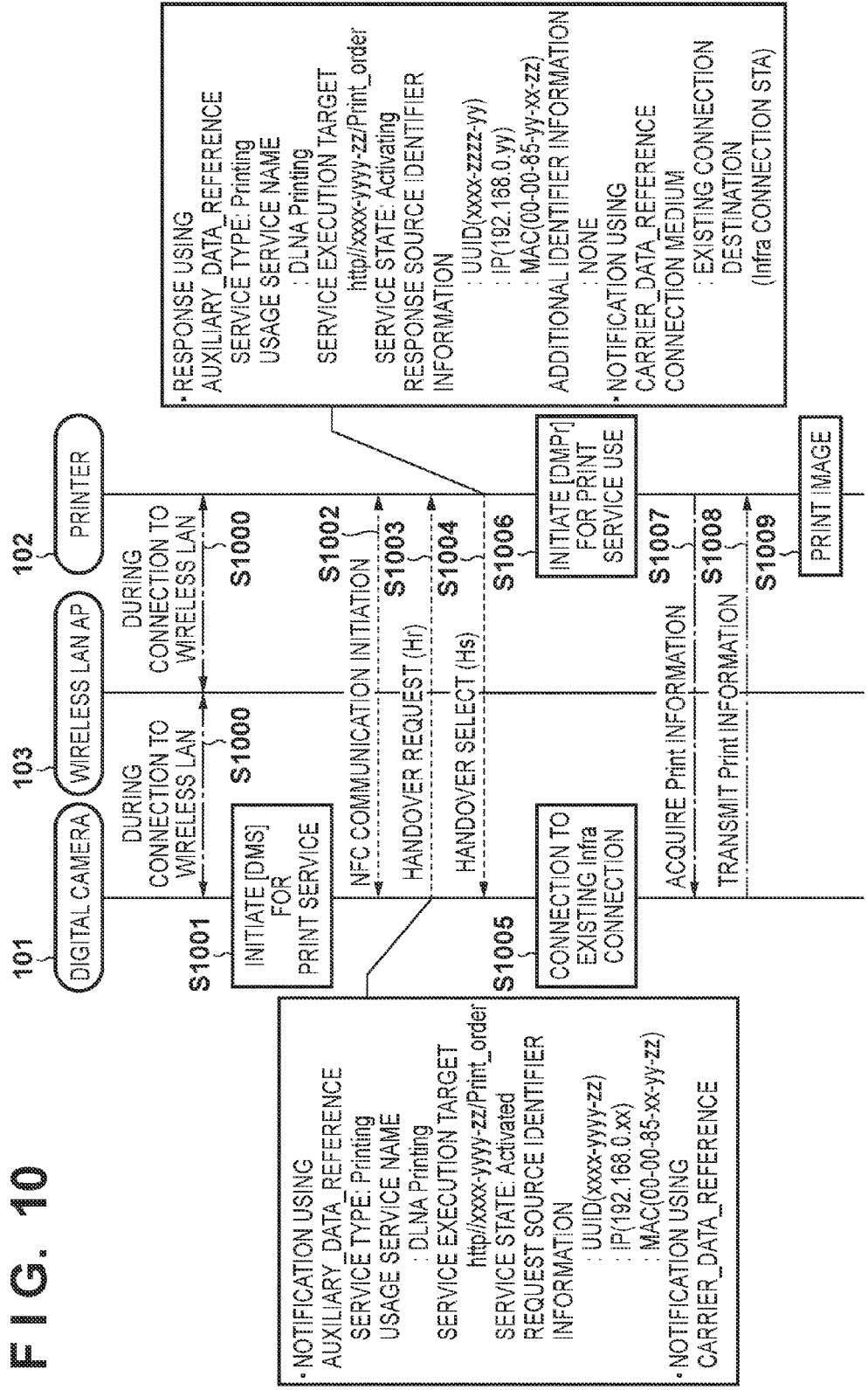
FIG. 10 is a view (part 1) for explaining a communication sequence for the first embodiment.

FIG. 8A and FIG. 8B are views for explaining an operational flow for the digital camera 101 according to this embodiment. Note that the control unit 206 may function as a determination unit configured to perform confirmation processing and determination processing, and a generation unit configured to perform processing to set information to generate a message. FIG. 9A and FIG. 9B are views for explaining an operational flow for the printer 102 according to this embodiment. Note that the control unit 305 may function as a determination unit configured to perform confirmation processing and determination processing, a generation unit configured to set addresses to generate a message, and a setting unit configured to set parameters for communications. FIG. 10 and FIG. 11 are views for explaining a communication sequence for this embodiment. FIG. 10 is a view for explaining a communication sequence that uses an existing wireless LAN communication path and executes a service, and FIG. 11 is a view for explaining a communication sequence that requests a new wireless LAN communication path, but executes a service using an existing communication path.

The digital camera 101 according to this embodiment, as shown in FIG. 10 and FIG. 11, is already connected (step S1000, step S1100) by a wireless LAN infrastructure mode with the wireless LAN AP 103 upon initiation of communication by NFC. Also, FIGS. 10 and 11 show a case where a DLNA Printing service is set (step S1001, step S1101) as a default activation request target service for the digital camera 101. Also, in FIG. 10, the printer 102 is connected (step S1000) to the wireless LAN AP 103 in a wireless LAN infrastructure mode, and in FIG. 11 the state is such that there is no connection with the wireless LAN AP 103 (step S1100).

Once the NFC communication control unit 520 for the digital camera 101 detects the nearby NFC communication unit 309 for the printer 102, communication with the printer 102 is established by NFC (step S801, step S901, step S1002, step S1102). Next, the service execution unit 530 for the digital camera 101 performs confirmation of whether or not a service to be executed has been determined (step S802). If a determination has not been made, (NO at step S802), the digital camera 101 performs a determination (step S810) as to whether or not there is a request for setting a wireless LAN communication path for an opposing apparatus (the printer 102). In the case there is a request (YES at step S810), the digital camera 101 sets information according to the request to "CARRIER_DATA_REFERENCE" (step S811), and transmits a handover request message (step S812). Thereafter, the digital camera 101 awaits receipt of the handover response message (step S813). In the case there is no request (NO for step S810), the digital camera 101 awaits receipt of the handover response message (step S813).

If a service to be executed is determined (YES for step S802), the digital camera 101 sets information related to the service to be executed to "AUXILIARY_DATA_REFERENCE" (step S803). Thereafter, the digital camera 101 performs a determination of whether or not (step S804) the wireless communication path for executing the service is an existing wireless LAN communication path. In other words, the digital camera performs a determination of whether or not to execute a service using a wireless LAN communication path that is in use in step S1000 and in step S1100. In the case of using an existing wireless LAN communication path (YES for step S804), the digital camera 101 sets information for using an existing wireless LAN communication path to "CARRIER_DATA_REFERENCE" (step S805). In the case an existing wireless LAN communication path is not used (NO for step S804), the digital camera 101 sets new setting information for wireless LAN communication path use to "CARRIER_DATA_REFERENCE" (step S806).

Note, as a determination criteria at step S804 for determining whether or not to use an existing wireless LAN communication path, for example, a determination of whether or not a service other than a service scheduled to be executed within the digital camera 101 is using the communication path may be used. Note, FIG. 10 shows a case wherein the digital camera 101 is not using an existing wireless LAN communication path for another service, and FIG. 11 shows a case wherein the digital camera 101 is using an existing wireless LAN communication path for another service.

Next, the digital camera 101 performs a confirmation of whether or not there is specification of logical address (IP address, or the like) for use by a wireless LAN communication path (step S807). If there is a specification, (YES for step S807), the digital camera 101 sets a logical address and identification information (UUID, MAC Address, or the like) collectively to an "AUXILIARY_DATA_REFERENCE" (step S808). In the case that there is not a specification (NO for step S807), the digital camera 101 only sets identification information (UUID, MAC Address etc) to "AUXILIARY_DATA_REFERENCE" (step S809). Afterwards, the digital camera 101 transmits a handover request message (step S812, step S1003, step S1103), and awaits reception of a handover response message from the printer 102 which is the opposing apparatus (step S812).

On the other hand, the printer 102, awaits reception of a handover request message (step S902) after establishment of communication by NFC with the digital camera 101 (step S901). In the case that reception of a handover request message is detected, the printer 102 performs determination of whether or not a service specified in the message (DLNA Printing in this embodiment) is executable (step S903). In the case that the printer 102 determines that the specified service is not executable (NO for step S903), a status within the handover response message is set to fail, and is returned (step S917). Thereafter, the printer 102 completes the processing unit.

In the case that the printer 102 determines that the specified service is executable (YES for step S903), confirmation of whether or not identification information for an opposing apparatus (the digital camera 101) is included in the handover request message is performed (step S904). In the case that the identification information for the digital camera 101 is included in the handover request message (YES for step S904), the printer 102 refers to stored content for an address registration table (FIG. 12A-FIG. 12C) within itself, and performs determination of whether or not the identification information is already registered (step S905).

As previously explained, FIG. 10 shows a case where the digital camera 101 and the printer 102 are connected to the wireless LAN AP 103, and FIG. 11 shows a case where the digital camera 101 is connected to the wireless LAN AP 103. Therefore in the case of FIG. 10, the address registration table for the printer 102 shows, as in FIG. 12A, that the digital camera 101 and the printer 102 are connected to the wireless LAN AP 103. Also, in the case of FIG. 11, the address registration table for the printer 102 shows, as in FIG. 12B, that the digital camera 101 is not connected to the wireless LAN AP 103.

For the determination at step S905, in the case of FIG. 10, the printer 102 recognizes that the opposing apparatus (the digital camera 101) exists in the same network. In this case, the printer 102, sets a current logical address for the self-apparatus (IP address etc) to an address of the transmission source device for an "AUXILIARY_DATA_REFERENCE" of the handover response message (step S906). Also, the printer 102, sets a parameter representing usage of an existing connection destination to an "AUXILIARY_DATA_REFERENCE" (step S907). Thereafter, the printer 102 returns a handover response message (a message with a success status added) (step S916, step S1004).

For the determination at step S905, in the case of FIG. 11, the printer 102 recognizes that the opposing apparatus (the digital camera 101) does not exist in the same network. In this case, the printer 102 refers to a "CARRIER_DATA_REFERENCE" within a parameter within a received handover request message (step S1003), and performs determination of whether or not there is a specification for setting information (step S908). In a case where the printer 102 determines that there is a specification for setting information (YES for step S908), it proceeds to perform determination of whether or not a setting modification based on the specified setting information is possible (step S909). As an example of a specific condition of whether or not setting modification is possible, there is a condition for an existence or absence of support for wireless LAN connection modes (ad hoc mode, direct mode, or the like), or a condition of whether there is already another service within the self-apparatus that is using a wireless LAN communication path. However, conditions other than those described above that are ascribable to a wireless communication medium of the handover destination may be used as determination criteria.

As a result of step S909, in a case where the printer 102 determines that the setting modification is possible based on the specified setting information (YES for step S909), parameter setting for using the specified connection destination is performed (step S910). In the case that there is no specification for setting information from the digital camera 101 (NO for step S908), or it is determined that setting modification is impossible (NO for step S909), the printer 102 performs setting of a connection parameter that is settable and held by the printer 102 (step S911). As a settable connection parameter, for example, in the case that there is already another service within the self-apparatus that is using a wireless LAN communication path, the same parameter as the setting of the communication path being used is used.

Next, the printer 102 performs a determination of whether or not a connection topology with the digital camera 101 is a P2P connection (step S912). In the case that the P2P connection is (YES for step S912), the printer 102 performs a determination of whether or not the logical address of the digital camera 101 is undecided (step S913). In the case that the logical address for the digital camera 101 is undecided (YES for step S913), the printer 102, generates each of the logical addresses for both apparatuses, and sets them to an "AUXILIARY_DATA_REFERENCE" (step S914). In the case that the logical address for the digital camera 101 is not undecided (NO for step S913), the printer 102 generates its own logical address based on the logical address system for the digital camera 101, and sets it to an "AUXILIARY_DATA_REFERENCE" (step S915).

Also, in the case that the connection topology is not a P2P connection (NO for step S912), the printer 102 does not perform updating of the "AUXILIARY_DATA_REFERENCE". Afterwards, the printer 102 sets the success status within the handover response message, and the updated parameter ("CARRIER_DATA_REFERENCE" and "AUXILIARY_DATA_REFERENCE"), and returns a response (step S916, step S1004, step S1104). Thereafter, the printer 102 completes the processing unit.

On the other hand, the digital camera 101 is in a state of awaiting reception of a handover response message from the printer 102, and when it receives this message (step S1004, step S1104), confirms the contents of the "CARRIER_DATA_REFERENCE" parameter information of the connection destination. Next, the digital camera 101 performs a confirmation of whether or not information (new connection destination information) other than an existing wireless LAN communication path in use is set (step S814). In the case that there is new connection destination information set (YES for step S814), the digital camera 101 updates (step S1105, step S1107) the wireless LAN setting information to the new connection destination and performs a connection (step S815). In the case that a new connection destination information is not set (NO for step S814), the existing connection is maintained (step S1005).

Next, the digital camera 101 refers to the "AUXILIARY_DATA_REFERENCE" in the received message and performs confirmation (step S816) of the existence or absence of information of a logical address to be used (IP address, or the like). In the case that there is logical address information (YES for step S816), the digital camera 101 performs setting of the logical address (step S817). In the case that there is no information for the logical address (NO for step S816), the digital camera 101 performs (step S818) processing for acquisition of a logical address that is usable in a wireless LAN environment (AutoIP, DHCP, or the like), and completes one processing unit. After the setting of the logical address is completed, the digital camera 101 executes the DLNA Printing service (step S1007-step S1009, step S1108-step S1110).

Note, in the above described embodiment, when transmitting the handover request message from the digital camera 101 to the printer 102, only one setting information item for a wireless LAN communication path is included, however, a plurality of setting information items may also be included. Also, in the case that setting information for a wireless LAN communication path on the side of the printer 102 is desired to be confirmed, the digital camera 101 may transmit without including setting information (NULL information may be set) in the handover request message. In these cases, the setting information for the wireless LAN communication path that is to be actually used for connecting, is notified of (step S1004, step S1104) by using the handover response message that is returned from the printer 102 to the digital camera 101, and shared between the apparatuses. Therefore, setting of the wireless LAN communication path and the logical address can be executed collectively.

As explained above, in this embodiment, the printer 102 adds status information representing continued usage of a wireless communication setting that is already in use in the handover response message for transmission. Because of this, the continued usage information of an existing communication path at the handover destination may be shared, enabling prevention of excess wireless communication parameter setting and logical addressing. In other words, new connection processing can be omitted. Also, it is possible to prevent an increase in time required until service initiation, ascribable to setting an unnecessary wireless parameter, for which there is a fear of execution before initiation of a service with a nearby apparatus.

Second Embodiment

Figure 14B:
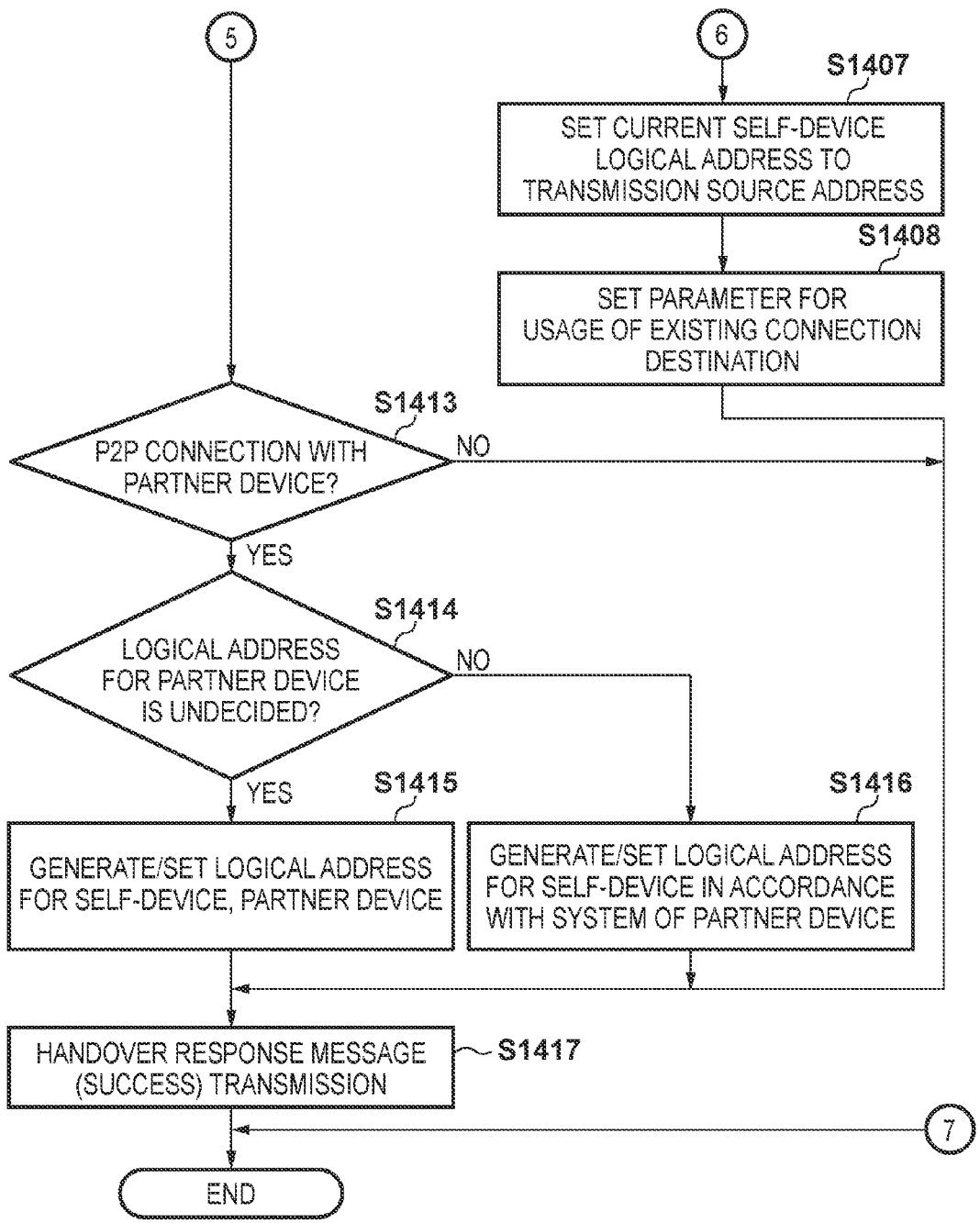

A operational procedure between the digital camera 101 and the printer 102 according to a second embodiment will be explained using drawings. As an example, an explanation will be given for an operational procedure for executing a service for "DLNA Printing" via a P2P communication path, or an existing wireless LAN communication path between the digital camera 101 and the printer 102. FIG. 8A and FIG. 8B are views for explaining the operational flow for the digital camera 101 according to this embodiment. FIG. 14A and FIG. 14B are views for explaining an operational flow for the printer 102 according to this embodiment. FIG. 15 is a view for explaining a communication sequence according to the present embodiment.

The digital camera 101 according to this embodiment, as shown in FIG. 15, is already connected by a wireless LAN infrastructure mode with the wireless LAN AP 103 upon initiation of communication by NFC (step S1500). Also, FIG. 15 shows a case where a Printing service using DLNA is set (step S1501) as a default activation request target service for the digital camera 101. Also, the printer 102 is also connected with the wireless LAN AP 103 in wireless LAN infrastructure mode (step S1500).

Once the NFC communication control unit 520 for the digital camera 101 detects a nearby NFC communication unit 309 for the printer 102, communication with the printer 102 is established by NFC (step S801, step S1401, step S1502). Next, the service execution unit 530 for the digital camera 101 performs confirmation of whether or not a service to be executed has been determined (step S802). If a determination has not been made, (NO at step S802), the digital camera 101 performs a determination (step S810) as to whether or not there is a request for setting a wireless LAN communication path for an opposing apparatus (the printer 102). In the case there is a request (YES at step S810), the digital camera 101 sets information according to the request to "CARRIER_DATA_REFERENCE" (step S811), and transmits a handover request message (step S812). Thereafter, the digital camera 101 awaits receipt of the handover response message (step S813). In the case there is no request (NO for step S810), the digital camera 101 awaits receipt of the handover response message (step S813).

If a service to be executed is determined (YES for step S802), the digital camera 101 sets information related to the service to be executed to "AUXILIARY_DATA_REFERENCE" (step S803). Thereafter, the digital camera 101 performs a determination of whether or not (step S804) the wireless communication path for executing the service is an existing wireless LAN communication path. In other words, the digital camera performs a determination of whether or not to execute a service using a wireless LAN communication path that is in use in step S1500. In the case of using an existing wireless LAN communication path (YES for step S804), the digital camera 101 sets information for using an existing wireless LAN communication path to "CARRIER_DATA_REFERENCE" (step S805). In the case an existing wireless LAN communication path is not used (NO for step S804), the digital camera 101 sets new setting information for wireless LAN communication path use to "CARRIER_DATA_REFERENCE" (step S806).

Next, the digital camera 101 performs a confirmation of whether or not there is specification of logical address (IP address, or the like) for use by a wireless LAN communication path (step S807). If there is a specification, (YES for step S807), the digital camera 101 sets a logical address and identification information (UUID, MAC Address, or the like) collectively to an "AUXILIARY_DATA_REFERENCE" (step S808). In the case that there is not a specification (NO for step S807), the digital camera 101 only sets identification information (UUID, MAC Address etc) to "AUXILIARY_DATA_REFERENCE" (step S809). Afterwards, the digital camera 101 transmits a handover request message (step S812, step S1503), and awaits reception of a handover response message from the printer 102 which is the opposing apparatus (step S812).

On the other hand, the printer 102 awaits (step S1402) reception of a handover request message after establishment (step S1401) of communication by NFC with the digital camera 101. In the case that reception of a handover request message is detected, the printer 102 performs determination of whether or not a service specified in the message (DLNA Printing in this embodiment) is executable (step S1403). In the case that the printer 102 determines that the specified service is not executable (NO for step S1403), a status within the handover response message is set to fail, and is returned (step S1418). Thereafter, the printer 102 completes the processing unit.

In the case that the printer 102 determines that the specified service is executable (YES for step S1403), confirmation of whether or not identification information for an opposing apparatus (the digital camera 101) is included in the handover request message is performed (step S1404). In the case that the identification information for the digital camera 101 is included in the handover request message (YES for step S1404), the printer 102 refers to stored content of an address registration table (FIG. 12A-FIG. 12C) within itself, and performs determination of whether or not the identification information is already registered (step S1405).

As previously explained, FIG. 15 shows a case where the digital camera 101 and the printer 102 are connected to the wireless LAN AP 103. Therefore the address registration table for the printer 102 shows, as in FIG. 12A, that the digital camera 101 and the printer 102 are connected to the wireless LAN AP 103. For the determination at step S1405, in the case of FIG. 15, the printer 102 recognizes that the opposing apparatus (the digital camera 101) exists in the same network.

Then, the printer 102 performs (step S1406) a determination of whether or not there is a request for "continued use of an existing connection destination" from the opposing apparatus (the digital camera 101) side. In the case that there is a request for "continued use of an existing connection destination" (YES for step S1406), the printer 102, in addition to setting a current logical address for the self-apparatus (IP address, or the like) to an address of the transmission source device within an "AUXILIARY_DATA_REFERENCE" for the handover response message (step S1407), also sets a parameter representing usage of the existing connection destination (step S1408). Thereafter, the printer 102 returns a handover response message (a message with a success status added) (step S1417).

The case in FIG. 15 is a case where there is no request for "continued use of an existing connection destination." In this case, the printer 102 refers to a "CARRIER_DATA_REFERENCE" within a parameter within the received handover request message (step S1503), and performs determination of whether or not there is a specification for setting information (step S1409). In the case that the printer 102 determines that there is a specification of setting information from the digital camera 101 (YES for step S1409), determination is performed as to whether or not setting modification based on the specified setting information is possible (step S1410). As an example of a condition that determines if setting modification is allowed, as was described in the first embodiment, there is an existence or absence for support of wireless LAN connection modes (ad hoc mode, direct mode, or the like).

As a result of step S1409, in a case where the printer 102 determines that the setting modification is possible based on the specified setting information (YES for step S1410), parameter setting for using the specified connection destination is performed (step S1411). In the case that there is no specification for setting information from the digital camera 101 (NO for step S1409), or it is determined that setting modification is impossible (NO for step S1410), the printer 102 performs setting of a connection parameter that is settable and held by the printer 102 (step S1412). As a settable connection parameter, as was described in the first embodiment, for example, in the case that there is already another service within the self-apparatus that is using a wireless LAN communication path, the same parameter as the setting of the communication path being used is used.

Next, the printer 102 performs a determination of whether or not a connection topology with the digital camera 101 is a P2P connection (step S1413). In the case that there is a P2P connection (YES for step S1413), the printer 102 performs a determination of whether or not the logical address (IP address, or the like) of the digital camera 101 side is undecided (step S1414). In the case that the logical address for the digital camera 101 is undecided (YES for step S1414), the printer 102, the logical addresses for both apparatuses are each generated, and set to "AUXILIARY_DATA_REFERENCE" (step S1415). In the case that the logical address for the digital camera 101 is not undecided (NO for step S1414), the printer 102 generates its own logical address based on the logical address system for the digital camera 101, and sets it to an "AUXILIARY_DATA_REFERENCE" (step S1416).

Also, in the case that it is determined not to be a P2P connection (NO for step S1413), the printer 102 does not perform updating of "AUXILIARY_DATA_REFERENCE". Afterwards, the printer 102 sets the success status within the handover response message, and the updated parameter ("CARRIER_DATA_REFERENCE" and "AUXILIARY_DATA_REFERENCE"), and returns a response (step S1417, step S1504). Thereafter, the printer 102 completes the processing unit.

On the other hand, the digital camera 101 is in a state of awaiting reception of a handover response message from the printer 102, and when it receives this message (step S1504), it confirms the contents of the "CARRIER_DATA_REFERENCE" parameter information of the connection destination. The digital camera 101 performs confirmation of whether or not information other than that for usage of an existing wireless LAN communication path is set (step S814).

In the case of FIG. 15, it is a case where there is no request for "continued use of an existing connection destination" and information other than usage of the existing wireless LAN communication path is set to the "CARRIER_DATA_REFERENCE". The digital camera 101 updates setting information for the wireless LAN (step S1505, step S1507) for the notified of connection destination, and performs a connection (step S815).

Next, the digital camera 101 refers to the "AUXILIARY_DATA_REFERENCE" in the received message and performs confirmation (step S816) of the existence or absence of information of a logical address (IP address etc) to be used. In the case that there is logical address information (YES for step S816), the digital camera 101 performs setting of the logical address (step S817). In the case that there is no information for the logical address (NO for step S816), the digital camera 101 performs (step S818) processing for acquisition of a logical address that is usable in a wireless LAN environment (AutoIP, DHCP, or the like), and completes one processing unit. After the setting of the logical address is completed, the digital camera 101 executes the DLNA Printing service (step S1508-step S1510).

Note, just as in the first embodiment, when transmitting the handover request message from the digital camera 101 to the printer 102, only one setting information item for a wireless LAN communication path is included, however, a plurality of setting information items may also be included. Also, in the case that setting information for a wireless LAN communication path on the printer 102 side is wished to be confirmed, the digital camera 101 may transmit without including setting information (NULL information may be set) for the wireless LAN communication path in the handover request message. In such cases, the setting information for the wireless LAN communication path that is to be actually used for connecting, is notified of (step S1504) by using the handover response message that is returned from the printer 102 to the digital camera 101, and since it will be shared between apparatuses, it is possible to execute the setting of the wireless LAN communication path and the logical address collectively.

As explained above, while in the first embodiment, a determination is performed as to whether or not an existing communication path is to be used is based on a sole decision by the side that received the handover request message (the printer 102 side), in the second embodiment, it becomes possible to add a request by the transmitting side (the digital camera 101) of the handover request message and perform the determination. Because of this, it is possible to confirm the connection destination in accordance with the request by the apparatus side that confirms the service to be executed at the handover destination (in this embodiment, the apparatus side transmitting the handover request message).

Other Embodiments

Also, according to the previously described first through second embodiments, an example was explained wherein, touching of the NFC is used as an opportunity to set the wireless LAN communication path, and use an existing wireless LAN communication path (the communication path via the wireless LAN AP that was in use prior to touching the NFC), without executing setting of a new wireless LAN connection setting, when executing a device cooperation service via the same communication path; however, this may also be widely applied to use cases where a single wireless communication medium is used for service activation and simultaneously executing connection setting for another wireless medium, in a case where a plurality of wireless communication mediums are supported simultaneously among devices. For example, this is also applicable to use cases, or the like, where notification of connection setting information for wireless LAN and activation instructions for services is performed using Bluetooth.

Note, an example was shown wherein the communication mode for NFC according to the previously described first through second embodiments, executes sharing of statuses and various setting information by transmission and reception of a handover response message (step S1003, step S1103, step S1503), and a handover initiation request message (step S1002, step S1102, step S1502), using a bidirectional communication path in the case that the digital camera 101 and the printer 102 are both operated in a P2P communication mode, however, information sharing is also possible for a communication mode for NFC when one side operates in a read/write mode, and the other side operates in a card emulation mode, and shared memory access between devices is used to perform a method of reading/writing an information records (FIG. 13A-FIG. 13G) that form the service initiation request message and the service initiation response message.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-021704, filed Feb. 6, 2014 which is hereby incorporated by reference herein in its entirety.

What is claimed is:

1. A communication apparatus comprising:
at least one processor; and
at least one memory storing code to be executed by the at least one processor, wherein the at least one processor executes the code to function as:
a first communication unit configured to perform wireless communication based on a first communication method;
a second communication unit configured to perform wireless communication based on a second communication method with a higher communication speed or a larger communication range than the first communication method;
a transmitting unit configured to transmit, by the first communication unit, identification information of the communication apparatus in a case where the communication apparatus is connected to another communication apparatus by the first communication unit;
a receiving unit configured to receive, by the first communication unit, instruction information for instructing to communicate in a second wireless network different from a first wireless network; and
in a case where the communication apparatus is connected to the other communication apparatus by the first communication unit and connected to the first wireless network by the second communication unit, a control unit configured to:
control the second communication unit to communicate with the other communication apparatus in the second wireless network, instead of the first wireless network, in a case where the receiving unit receives the instruction information after the transmitting unit transmits the identification information, and
control the second communication unit to communicate with the other communication apparatus in the first wireless network in a case where the receiving unit does not receive the instruction information after the transmitting unit transmits the identification information.

2. The apparatus according to claim 1, wherein the second wireless network is a wireless network in which the communication apparatus communicates directly with the other communication apparatus.

3. The apparatus according to claim 1, wherein the second communication unit is used to communicate print data with the other communication apparatus via the first wireless network or the second wireless network.

4. The apparatus according to claim 1, wherein the instruction information is an instruction to switch a communication mode.

5. The apparatus according to claim 1, wherein the detection unit detects the other communication apparatus based on a MAC address, an UUID address, or an IP address received by the first communication unit from the other communication apparatus.

6. The apparatus according to claim 1, wherein the first communication method is a Near Field Communication method.

7. The apparatus according to claim 1, wherein the second communication method is a method compliant with IEEE 802.11 series.

8. The apparatus according to claim 1, wherein the control unit, in a case where the communication apparatus is connected to the other communication apparatus by the first communication unit, controls the first communication unit to transmit information about a service executable by the communication apparatus for the other communication apparatus.

9. The apparatus according to claim 1, wherein, in a case where the communication apparatus is connected to the other communication apparatus by the first communication unit and connected to the first wireless network by the second communication unit, the control unit controls the first communication unit to transmit information indicating that the communication apparatus is connected to the first wireless network to the other communication apparatus.

10. A control method of a communication apparatus having a first communication unit configured to perform wireless communication based on a first communication method and a second communication unit configured to perform wireless communication based on a second communication method with a higher communication speed or a larger communication range than the first communication method, the method comprising:
transmitting, by the first communication unit, identification information of the communication apparatus in a case where the communication apparatus is connected to another communication apparatus by the first communication unit;
receiving, by the first communication unit, instruction information for instructing to communicate in a second wireless network different from a first wireless network; and
in a case where the communication apparatus is connected to the other communication apparatus by the first communication unit and connected to the first wireless network by the second communication unit:
controlling the second communication unit to communicate with the other communication apparatus in the second wireless network, instead of the first wireless network, in a case where a receiving unit receives the instruction information after a transmitting unit transmits the identification information, and
controlling the second communication unit to communicate with the other communication apparatus in the first wireless network in a case where the receiving unit does not receive the instruction information after the transmitting unit transmits the identification information.

11. A non-transitory computer-readable storage medium storing a computer program for controlling a computer to execute a control method of a communication apparatus having a first communication unit configured to perform wireless communication based on a first communication method and a second communication unit configured to perform wireless communication based on a second communication method with a higher communication speed or a larger communication range than the first communication method, the method comprising:

transmitting, by the first communication unit, identification information of the communication apparatus in a case where the communication apparatus is connected to another communication apparatus by the first communication unit;

receiving, by the first communication unit, instruction information for instructing to communicate in a second wireless network different from a first wireless network; and in a case where the communication apparatus is connected to the other communication apparatus by the first communication unit and connected to the first wireless network by the second communication unit:

controlling the second communication unit to communicate with the other communication apparatus in the second wireless network, instead of the first wireless network, in a case where a receiving unit receives the instruction information after a transmitting unit transmits the identification information, and controlling the second communication unit to communicate with the other communication apparatus in the first wireless network in a case where the receiving unit does not receive the instruction information after the transmitting unit transmits the identification information.

* * * * *